United States Patent [19]

Fry et al.

[11] Patent Number: 5,506,957
[45] Date of Patent: Apr. 9, 1996

[54] SYNCHRONIZATION FOR OUT OF ORDER FLOATING POINT DATA LOADS

[75] Inventors: Richard E. Fry, Round Rock; Troy N. Hicks; Larry E. Thatcher, both of Austin, all of Tex.

[73] Assignee: International Business Machines Corporation, Armonk, N.Y.

[21] Appl. No.: 497,639

[22] Filed: Jun. 30, 1995

Related U.S. Application Data

[63] Continuation of Ser. No. 983,930, Dec. 1, 1992.
[51] Int. Cl.$^6$ .................................................. G06F 11/00
[52] U.S. Cl. ....................... 395/182.07; 371/2.1; 371/5.4; 395/184.01
[58] Field of Search ..................... 395/182.07, 184.01; 371/2.1, 5.4

[56] References Cited

U.S. PATENT DOCUMENTS

| | | | |
|---|---|---|---|
| 4,573,118 | 2/1986 | Damoany et al. ....................... | 364/200 |
| 4,630,195 | 12/1986 | Hester et al. . | |
| 4,763,294 | 8/1988 | Fong . | |
| 4,774,659 | 9/1988 | Smith et al. ........................... | 364/200 |
| 4,905,141 | 2/1990 | Brenza .................................... | 364/200 |
| 4,961,162 | 10/1990 | Nguyenphu et al. . | |
| 5,075,840 | 12/1991 | Grohoski et al. . | |
| 5,150,470 | 9/1992 | Hicks et al. . | |
| 5,202,972 | 4/1993 | Gusefski et al. ....................... | 395/425 |
| 5,260,952 | 11/1993 | Beilstein, Jr. et al. .................. | 371/63 |
| 5,295,249 | 3/1994 | Blaner et al. .......................... | 395/375 |

OTHER PUBLICATIONS

V. Oklobdzija, CPU–Coprocessor Communication and Synchronization, Aug. 1988, p. 696 FIG. 1.

IBM TDB, "Fixed–Point/Floating–Point Synchronization", vol. 35, No. 1B, Jun. 1992, pp. 398–399.

*IBM RISC System/6000 Technology*, First Edition 1990, "Branch and Fixed–Point Instruction Execution Units", G. F. Grohoski et al, pp. 24–30.

Primary Examiner—Robert W. Beausoliel, Jr.
Assistant Examiner—Norman Wright
Attorney, Agent, or Firm—Mark E. McBurney

[57] ABSTRACT

A system that allows the continuous accessing of data on a floating point processor unit (FPU), by providing two data ports and corresponding buses between the data cache and the FPU. Further, synchronization between the fixed point unit (FXU), which provides the addresses, and the FPU is provided so that data can be loaded in the event of a data cache miss. This synchronization allows data to be transferred from the DCU to the FPU independent of an error condition (cache miss) on one of the buses. If a cache miss occurs that affects a first one of the buses, then the instruction corresponding to this data is held. Subsequent floating point data is received by the FPU on the second bus not subject to the miss. Synchronization signals include, load ready (LD1_RDY) indicating to the FPU that data is on the bus and ready to be moved to the FPU and load not ready (LD1_NRDY) that means a floating point load has executed successfully in the FXU, but due to a cache miss, the data is not yet available to the FPU. The FXU sends an address, along an address bus corresponding to the data bus not affected by the miss, for data in the cache. Thus, even in the case of a data cache miss, the FPU can continue operations by loading data, that has been addressed to the data port which does not correspond to the cache miss.

17 Claims, 5 Drawing Sheets

| cyc 1 | cyc 2 | ... | cyc n |
|---|---|---|---|
| LFS OP<br>GEN E/A | DC_MISS<br>FLDx_NRDY | | FLDx_RDY<br>LDx_DREG<br>LDx_ROT |

FIG. 7

| | cycle 1 | 2 | 3 | 4 | 5 | 6 |
|---|---|---|---|---|---|---|
| DATA BUS 31<br>ADDR. BUS 41 | LFS0<br>(E/A gen) | LD_NRDY0<br>DC_MISS | DC_MISS | DC_MISS | LD_RDY0<br>LD_DREG0<br>LD_ROT0 | LD_FPR |
| DATA BUS 33<br>ADDR. BUS 43 | LFS1<br>(E/A gen) | LD_RDY1<br>LD_DREG1<br>LD_ROT1<br>LFS2<br>(E/A gen) | LD_FPR1<br>LD_RDY2<br>LD_DREG2<br>LD_ROT2<br>LFS3<br>(E/A gen) | LD_FPR2<br>LD_RDY3<br>LD_DREG3<br>LD_ROT3 | LD_FPR3 | |

| cycle | 2 | 3 | 4 | 5 | 6 |
|---|---|---|---|---|---|
| XOU_FL_LD0_RDY | 0 | 0 | 0 | 1 | 0 |
| XOU_FL_LD0_NRDY | 1 | 0 | 0 | 0 | 0 |
| XOU_FL_LD0_DREG(0..3) | ---- | ---- | ---- | <VALID> | ---- |
| XOU_FL_ROT_LF0(0..1) | ---- | ---- | ---- | <VALID> | ---- |
| XOU_FL_LD1_RDY | 1 | 1 | 1 | 0 | 0 |
| XOU_FL_LD1_NRDY | 0 | 0 | 0 | 0 | 0 |
| XOU_FL_LD1_DREG(0..3) | <VALID> | <VALID> | <VALID> | ---- | ---- |
| XOU_FL_ROT_LF1(0..1) | <VALID> | <VALID> | <VALID> | ---- | ---- |

FIG. 8

SYNCHRONIZATION FOR OUT OF ORDER FLOATING POINT DATA LOADS

This is a continuation of application Ser. No. 07/983,930 filed Dec. 1, 1992.

BACKGROUND OF THE INVENTION

1. Field of the Invention

The present invention is generally related to the synchronization protocol between a floating point unit (FPU) and a fixed point unit (FXU) during data load operations. More particularly, this synchronization allows out of order load operations when a data cache miss occurs, thereby improving performance of the system.

2. Description of Related Art

Currently it is known to couple a FXU and FPU such that the fixed point unit can operate as the control unit for the floating point load and store operations, "IBM RISC System/6000 Technology", First Edition, published. 1990, (hereby incorporated by reference) pgs. 24–30. For example, in the IBM RISC system/6000 workstations (RISC System/6000 is a trademark of IBM Corp.) the FXU is used as an address generator for the FPU such that data from the data cache unit (DCU) is loaded into the FPU only when addressed by the FXU. A problem exists since the FPU and FXU operate in a synchronous manner and when a data cache miss occurs, several cycles may elapse before the data can be loaded into the FPU. Thus, an inefficiency exists since the FPU is sitting idle for several machine cycles.

U.S. Pat. No. 4,961,162, hereby incorporated by reference, describes using a fixed point processor to compute a memory address for the floating point data required for floating point operations. U.S. Pat. No. 4,763,294 is another example of the prior art wherein a floating point unit is coupled to a central processing unit and is capable of executing floating point instructions while the CPU executes some non-floating point operations in parallel. However, it can be seen that only a single data port is provided to the FPU and any data load misses will cause the FPU to sit idle for however many machine cycles it takes to correct the data miss. U.S. Pat. No. 5,150,470 is an instruction execution circuit that tags decoded instructions for execution when corresponding data becomes available. U.S. Pat. No. 5,075,840, hereby incorporated by reference, describes a buffer which stores instructions for execution by two processors. IBM Technical Disclosure Bulletin, vol. 32, no. 12, May 1990, pgs. 132–133 discloses that a synchronization pulse is sent from a fixed point unit to an instruction cache unit and describes a method of predicting translation errors for words being loaded or stored.

IBM Technical Disclosure Bulletin, vol. 35, no. 1B, June, 1992, pg. 398–399 describes coordinating and controlling instruction execution in fixed point and floating point instructions with relation to a fixed point instruction. This counter allows the floating point unit to complete an instruction only when the counter has a number greater than zero so that an executed floating point instruction will never get backed out. However, there is no description of more than a single data port between the cache unit and the floating point unit.

It can readily be seen that a processor system that allows virtually continuous execution of instructions on the floating point unit, regardless of the existence of a data load miss, would be desirable.

SUMMARY OF THE INVENTION

In contrast to the prior art, the present invention allows the continuous execution of instructions on the FPU by providing two data ports and data buses between the data cache and the FPU, along with two corresponding address buses. Further, synchronization between the FXU (which provides the addresses) and the FPU is provided such that out of order loads will occur in the event of a data cache miss.

Broadly, a floating point unit having two data input ports and corresponding data registers, buses and data rotators is provided. Additionally, floating point registers are connected to the two rotators. The FPU data input ports are connected via separate data buses to corresponding data output ports on a data cache unit (DCU) such that data is transferred between the FPU and DCU. The fixed point unit is interconnected to the data cache unit through two address buses, which correspond to the data buses, and provides an address for the data being input to the FPU. Furthermore, the fixed point unit and the floating point unit are in communication with one another wherein the FXU provides synchronization data to the FPU such that data from the cache will be continuously input thereto. The synchronization allows data to be transferred from the DCU to the FPU independent of an error condition (cache miss) on one of the buses. If a cache miss occurs that affects a first one of the buses, then the instruction corresponding to this data is held. Any subsequent floating point instruction is then received by the FPU on the second bus not subject to the miss. In this manner, out of order instruction executions are implemented in the FPU.

This synchronization includes signals to indicate the status of the data being input to the FPU. For example, load ready (LD1_RDY) indicates to the FPU that the data is on the bus and ready to be loaded. Conversely, a load not ready (LD1_NRDY) indicates that a floating point load has executed successfully in the fixed point unit, but due to an error, such as a cache miss, the data is not yet available to the floating point unit. The signal, LD1_DREG tells the floating point unit to load data from the data port 1 into the corresponding data registers. The fixed point unit also instructs the FPU to rotate the data when it is loaded for the data registers into the floating point registers in order to align it into the correct format, i.e. the most significant data words are shifted into the most significant word positions.

By sending the previously described signals to the FPU, the fixed point unit is capable of ensuring a steady flow of data to the floating point unit, thereby increasing efficiency and performance of the systems.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
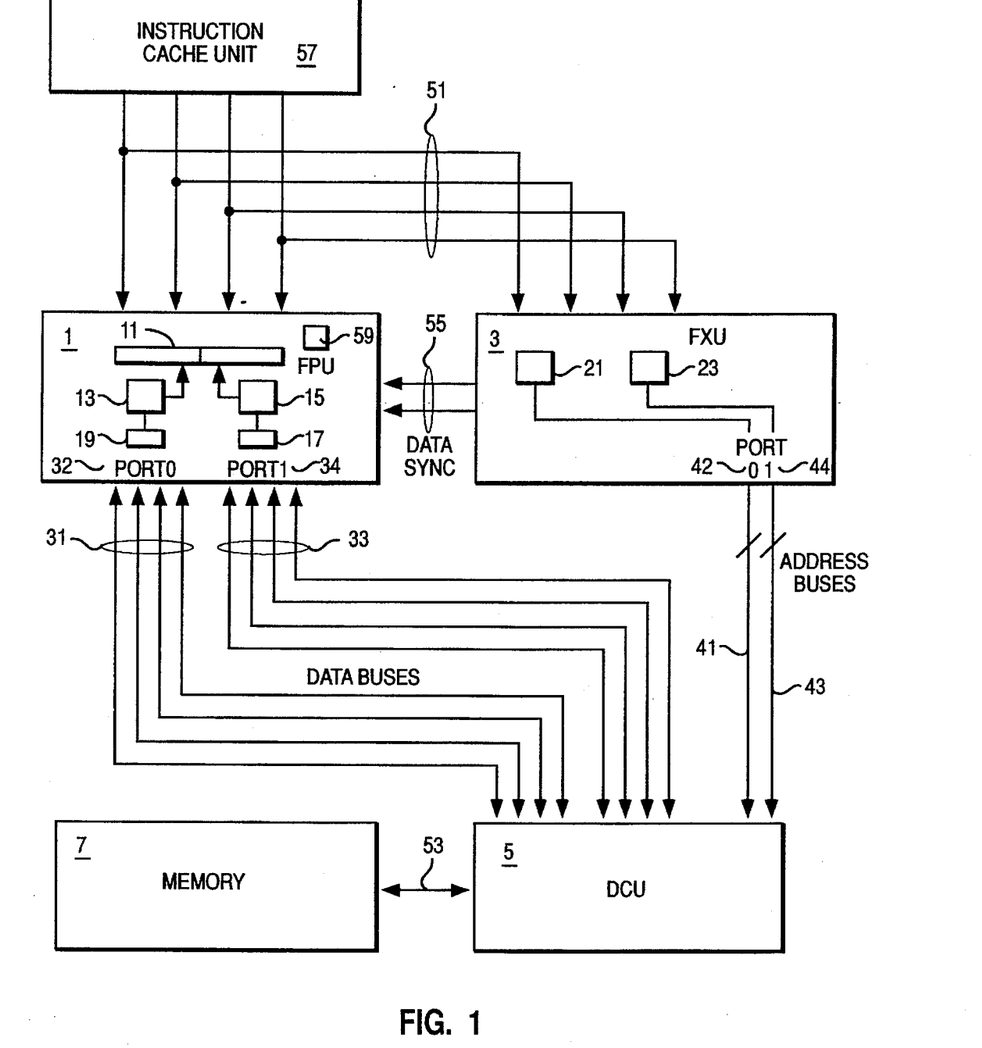
FIG. 1 is a schematic diagram showing the interconnection of the FPU, FXU, DCU and memory of the present invention.

Referring to FIG. 1, a processor chip set is shown for a workstation, such as a RISC System/6000 and includes a memory 7, data cache unit 5, fixed point unit 3 and floating point unit 1. FIG. 1 illustrates these functional elements as separate chips, but it should be noted that this functionality could be included on a single chip, if desired. Memory 7 is random access memory (RAM) which communicates with DCU 5 by a bus 53. In this manner, data words are provided from memory 7 to the DCU 5. This data is in floating point format and further communicated from the DCU to the floating point unit 1 via data buses 31 and 33. In accordance with the present invention, two floating point data buses are provided which can be alternatingly controlled to allow for out of order data loads and execution of instructions. Data buses 31 and 33 provide the data to FPU 1 through respective data ports 32 and 34 (also shown as port 0 and 1). Both of data buses 31 and 33 are capable of communicating four individual 32 bit data words such that two 128 bit buses are provided. Data registers 19 and 17 receive the data words from ports 32 and 34, respectively, and temporarily store the data prior to transferring it to rotators 13 and 15. The data is then rotated, if required, before being placed in the floating point registers 11. It should be noted that each of the two buses 31 and 33 are quad word buses, which each allow four 32 bit words to be placed in FPU 1. In the event that a single word is being moved from the DCU to the floating point unit, the single word needs to be rotated into the most significant word position. Of course, if a load double load occurs in the FPU a load double rotation will place two single words in the two most significant word positions prior to moving the data into the floating point registers 11 for execution. Rotation of data will be discussed in more detail below.

Subsequent to the data being placed in the floating point registers 11, floating point instructions are executed by the FPU and the FXU synchronously. These instructions are communicated to the FPU and the FXU across bus 51 from an instruction cache unit 57. The instruction cache unit receives the instructions from memory 7. These instructions are then executed in the FPU and FXU. Floating point operations are used by a process, such as an application program, operating system, or other routine which requires floating point arithmetic.

Fixed point unit 3 provides address information to DCU 5 for the data words to be input to FPU 1. This address information will allow the out of order instruction feature of the present invention to operate. Address buses 41 and 43 communicate the address information to the data cache unit 5. These address buses correspond to FXU output ports 42 and respectively, which are also shown as ports 0 and 1, to correspond to FPU ports 0 and 1. Associated address generators 21 and 23 correspond to ports 42 and 44 and provide the actual FPU address for the data in the DCU. It should be noted that the addresses provided to the DCU, on specific address buses 41, 43, dictate which one of the data ports 32 or 34, in the FPU, will receive the data from the DCU. The addresses may be generated from either of address generators 21, 23, but the bus on which the address is supplied (41 or 43) will determine which specific data bus 31 or 33 will send the data to the FPU. More particularly, address bus 41 and data bus 31 are tied together such that an address received by the DCU from the FXU on address bus 41 will cause the data to be sent to port 32 of the FPU (via bus 31). Similarly, an address received on bus 43 will send data to port 34 on bus 33. Therefore, it can be seen that data in the DCU can be input to either FPU port 32 or 34, depending upon which address bus transmits the generated address from the FXU 3. Since the data can be transmitted on either of data buses 31 or 33, synchronization signals provided to the floating point unit 1, by synchronization bus 55, must coordinate operations between the FXU and FPU. This bus transmits synchronization commands from the fixed point unit to the floating point unit such that the. FPU will know at which data port the data will be received. The synchronization of the fixed point and floating point units will be described in greater detail in conjunction with FIG. 3.

Figure 2:
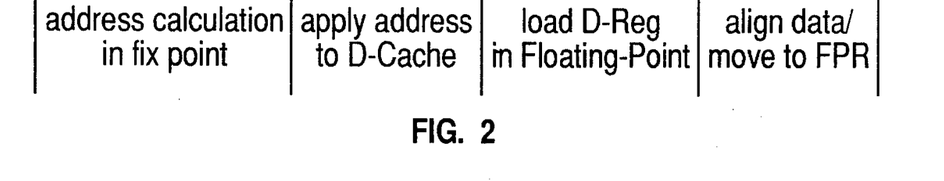
FIG. 2 is a sequence of the events sent from the fixed point unit to the floating point unit for a normal data load to the FPU.

FIG. 2 provides the sequence of events which must occur in order for data to be loaded into the FPU in accordance with the present invention. Initially, the fixed point unit 3 calculates an address within one of the address generators 21, 23 and then applies this address to DCU 5 (via one of buses 41, 43). The bus on which this address is transmitted will determine which one of the data buses 31 or 33 will be used to transmit the data to the FPU (and ultimately which data port 32 or 34 will receive the data). Next, the data is provided to the FPU and loaded into data registers 17, 19. Alignment of the data then occurs such that the data words are in the most significant positions. Finally, the aligned data is moved into the floating point registers 11.

Figure 3:
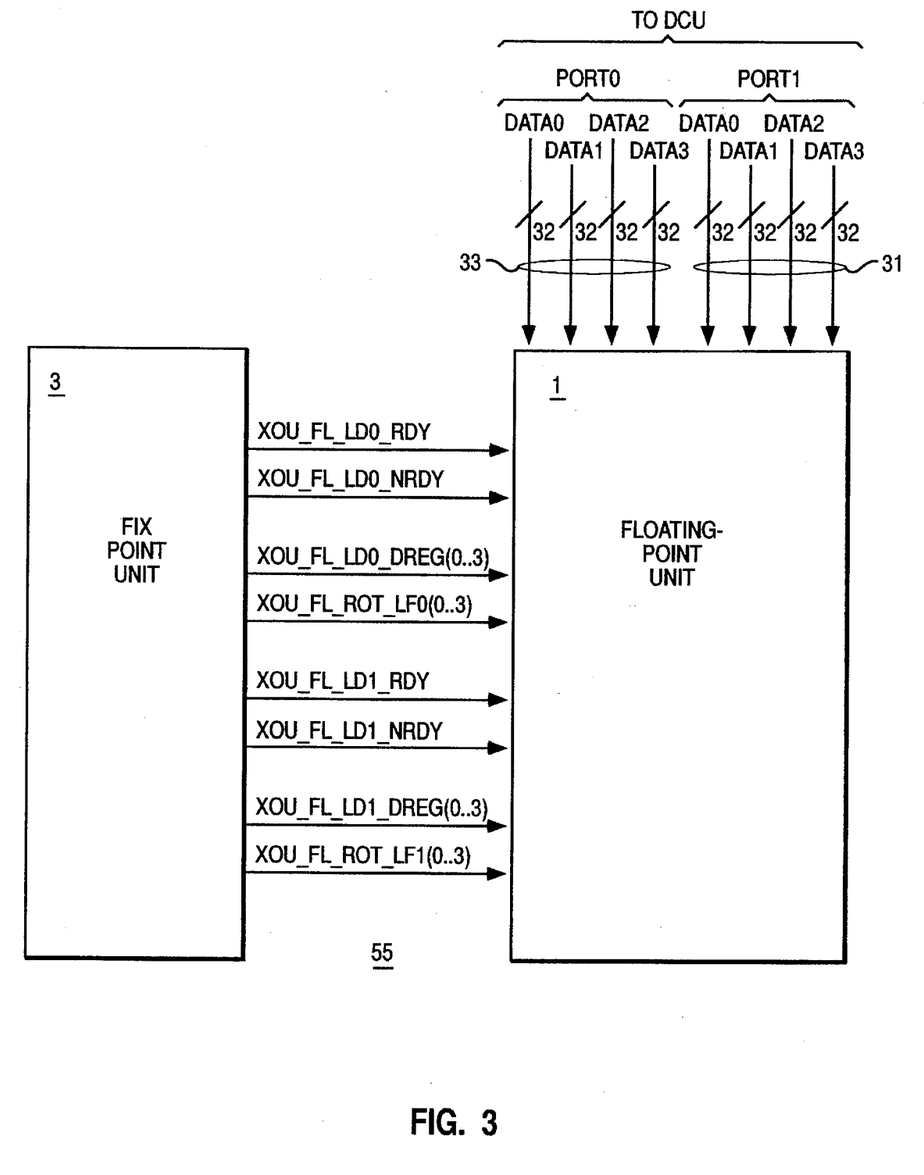
FIG. 3 is a diagram illustrating the signals sent by the fixed point unit to the floating point unit to synchronize the loading of data from the cache.

The present invention will now be more fully described with regard to FIG. 3 which illustrates the FPU 1, FXU 3 and the synchronization commands communicated from the fixed point unit 1 to the floating point unit 3 over synchronization bus 55. It should be noted that two sets of identical commands are utilized, one set for each of the data buses 31, 33 and their respective FPU ports 32 and 34.

The first signal shown is the floating point load ready command (XOU_FL_LDX_RDY). The "X" position in all of the synchronization commands of the present invention indicate which of the data ports 32, 34 on the FPU will receive the data. It can be seen from FIG. 1 that data ports 32 and 34 are noted on the FPU as port 0 and port 1, respectively. In this manner, if the load ready command corresponds to data being input to port 1, then the command will actually be configured XOU_FL_$_{LK1}$_RDY, wherein the "1" corresponds to data port 1. Of course, the same command with a "0" replacing the "1" will correspond to data being transmitted to port 0.

The load ready command is a signal to the floating point unit that data is currently on one of buses 31, 33, depending upon which address bus 41 or 43 the data is accessed from in the data cache unit 5. The address causes the data in the DCU to be addressed and placed on the appropriate associated data bus.

A load not ready command, XOU_FL_LDX_NRDY, is provided by the FXU to the FPU when a cache miss is detected in the DCU 5 and the data is not yet available to be placed on the bus prior to being loaded into the floating point unit. This command also-informs the FPU that, in the event, the next sequential floating point load instruction occurs while the cache miss is still present, data will be arriving on the other data port. It should be noted that the not ready signal tells the floating point unit that the bus on which data was expected to be received is busy and if another data load occurs while the miss is present, then the next data will be received on the other bus (the one not subject to the miss). Normally, the FXU executes the instruction and the FPU associates data with these instructions. After the not ready, the FPU knows that the data will not be transmitted due to the cache miss. In this case, the floating point unit will hold the instruction in storage buffer 59, or the like, that is associated with the data on the bus subject to the miss. This instruction will be held until a ready signal is received. Meanwhile, the FPU will execute instructions associated with data received on the other bus (out of order execution and data load), before executing the held instruction and associated data subsequent to the resolution of the miss. For example, if data is being loaded onto buses 31 and 33 from the DCU and a cache miss occurs in the DCU for data to be loaded on bus 31, then the load not ready signal for bus 31 (port 0) will tell the FPU to hold the instruction associated with this data and if another FPU data load occurs before the miss is resolved, the data will arrive on bus 33 (at port 1). In this manner, the data on bus 31 and an associated instruction is held during the period of the miss, and the next data and associated instruction will be put on bus 33 and executed out of order, if another FPU load occurs prior to resolution of the miss.

Figure 4:
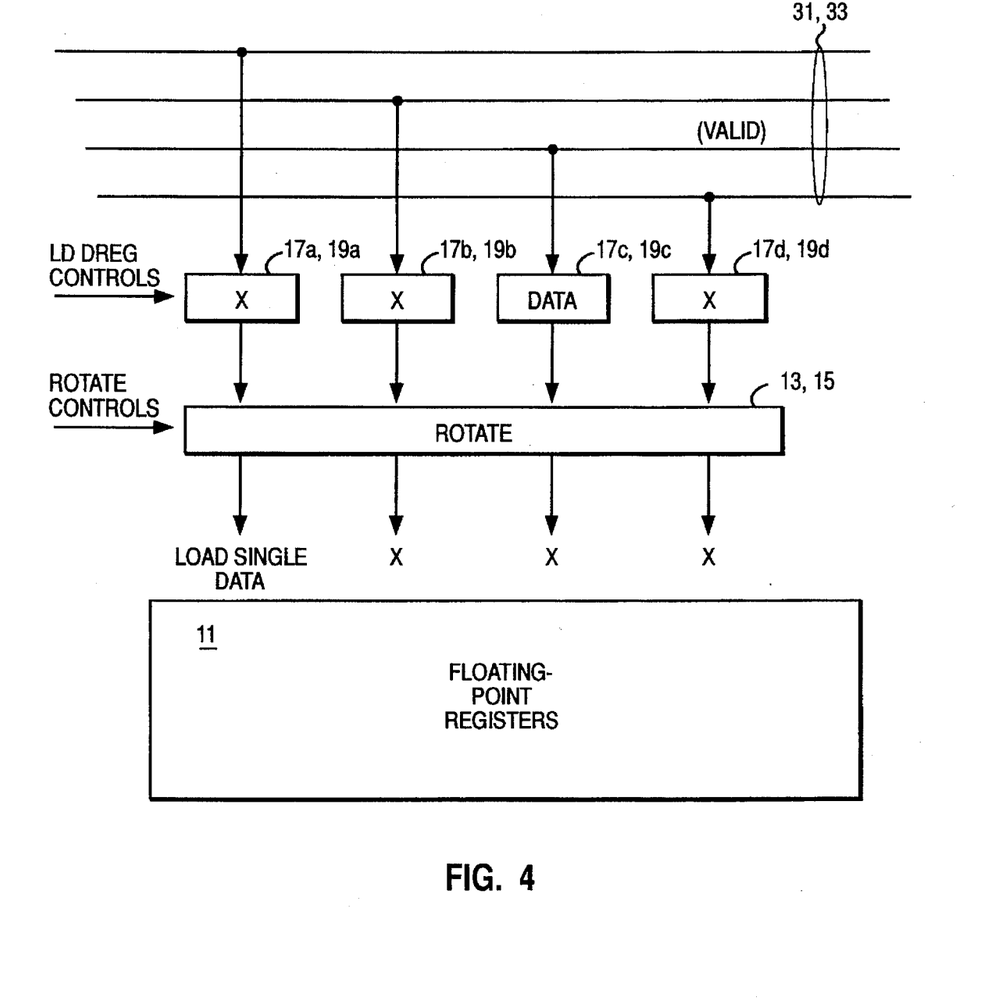
FIG. 4 is shows the rotation of data within the floating point unit, prior to a single load operation of data into the floating point registers.

The load data register signal, XOU_FL_LDX_DREG, controls the loading of data into the data registers 17, 19 of the FPU. This command tells the floating point unit to move data from the data ports 32, 34 into respective data registers 19 and 17. It should be noted that there are four 32 bit data registers 17a–17d and 19a–19d (FIG. 4) for each data port that receive 32 bit data words from each of the respective data buses 31 and 33, which each include four 32 bit buses 0–3 (FIGS. 3 and 4). Four bits on each data port control the four data registers corresponding to that port. A hexadecimal command will indicate which data registers are to be loaded with data from the respective port. For example, XOU_FL_LDX_DREG(O . . . 3)=B'0011' will load data registers 2 and 3 (e.g. 17c and 17d) with corresponding 32 bit data words from 128 bit buses 31 or 33.

As noted briefly above, data provided to the FPU must be aligned. The rotate data command, XOU_FL_ROT_LF, controls the shifting of the floating data as it is placed into the floating point registers 11, in order to place the most significant data word in the first position. The controls used to rotate the data are binary 00, 01, 10, 11, which correspond to a rotation amount of 0, 1, 2, 3. Thus, the rotated data command will also include the amount of rotation that is to occur. For example, XOU_FL_ROT_LFX(0 . . . 3)=B'01' will cause the data word to be rotated one position. The actual function of these synchronization commands will be described in greater detail below in conjunction with a discussion of the overall operation of the present invention.

Referring to FIG. 4, the data rotation control provided by the FXU to the FPU will be described. It should be noted that data provided form the DCU to the floating point unit on either bus 31 or 33 and corresponding port 32, 34 will be rotated identically. Therefore, the data bus of FIG. 4 includes reference numerals 31, 33 corresponding to the buses shown in FIG. 1. Data registers 17a–17d and 19a–19d are the four 32 bit data registers that make up registers 17 and 19. It should be noted that 128 bit data buses 31 and 33 each include four 32 bit data buses (0–3) which each correspond to one of the data registers 17a–d and 19a–d. These 32 bit buses will each transmit a single data word from the DCU. Thus, it can be seen that a quad load operation will occur if each of the 32 bit buses 0–3 include a data word. Further, rotators (13, 15) contained in the FPU and illustrated in FIG. 1 are also shown in FIG. 4. It can be seen that a single load operation is illustrated by FIG. 4. That is, one data word has been provided from registers 17c or 19c. To place the single data word in the appropriate position, the FXU will send a rotate data command to the FPU and cause the data word to rotate into the most significant data word position. In this case, a XOU_FL_ROT_LF(O . . . 1) =B'10' will be issued to the floating point unit. The binary number 10 tells the FPU to rotate the data by two places. It can be seen that the data in register 17c or 19c is rotated two places to the most significant position as it is input to floating point registers 11.

Figure 5:
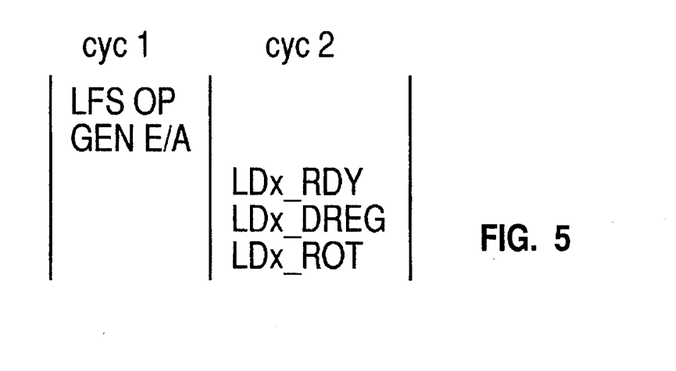
FIG. 5 is a chart showing the flow of synchronization signals for two machine cycles.

FIG. 5 shows the operations previously described in relation to machine cycles within the processing system. At cycle 1, a load float single (single data word to be placed in the floating point registers) is initiated by the fixed point unit. Also, during cycle 1, the fixed point unit generates an effective address and places the address on either of the DCU 5 address buses 41 or 43 (FIG. 1). Thus, during the first cycle, the FXU initiates a single floating point load and generates an address for the data in the DCU and applies this address to the data in the DCU. The address accesses the data and places it onto the data bus associated with that address bus (address bus on which the address is transmitted) to send the data from the DCU to one of the data ports 32, 34. It should be noted that address buses 41, 43 are tied with data buses 31, 33, respectively, therefore, if an address arrives on address bus 41, the data will be sent to the FPU on data bus 31. Similarly, an address on bus 43 will cause data to be sent on data bus 33.

At cycle 2, the fixed point unit transmits the synchronization commands to the floating point unit. It can be seen in this example that there are no data cache misses present, thus the not ready command will not be used. The fixed point unit sends a LDX_RDY signal to the floating point unit telling it that there is data on the data buses 31, 33 ready to be moved into the load registers. The LDX_DREG is sent to the floating point unit to cause the FPU to load the data registers 17, 19 with data that had been placed on the bus by the DCU. Next, the LDX_ROT synchronization command causes the rotators 13, 15 to align the data as it is loaded into the floating point registers with the most significant data word in the first position. Of course, as shown in FIG. 3, the FXU will use two sets of synchronization commands corresponding to both data ports 32, 34 in order to allow, under normal conditions, data to be moved from the DCU to the FPU in parallel along buses 31, 33. Thus, the data is moved from the data cache unit to the floating point unit within two system cycles.

Figure 6:
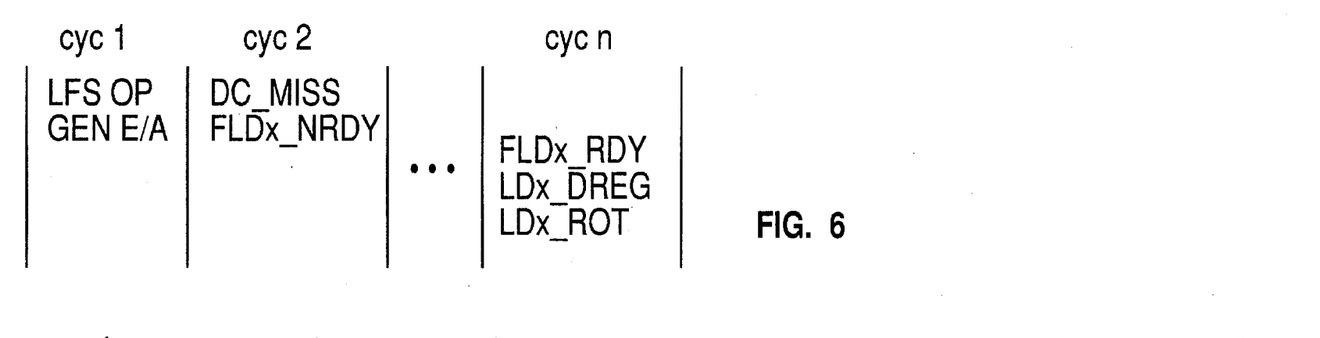
FIG. 6 is a chart showing the flow of synchronization signals for n cycles when a cache miss occurs.

The operation of the present invention when a data cache miss occurs will now be described in conjunction with FIG. 6. At cycle 1, the FXU initiates a load float single operation and generates the effective address and places this address on the DCU address bus 41 or 43. Then, during cycle 2 a data cache miss occurs in DCU 5 such that data cannot be placed on the data buses 31, 33. A data cache miss is generally considered to be an absence of data in the cache unit. Thus, based on the data cache miss, the fixed point unit provides a load not ready, LDX_NRDY, signal to the floating point unit, informing the FPU that a pending load is present on this port (1 or 0) and to look to the other port for the next data, if the miss is still present when another load instruction is encountered. Thus, the FPU will take an out of order load as the next data word to be received.

At the nth cycle, the data cache miss is resolved and a load ready (LDX_RDY) signal is presented to the FPU. The floating point unit then knows to look for data at the data port corresponding to the bus 31 or 33 associated with the cache miss. The load register (LDX_DREG) signal is then provided to the FPU and the data is then moved into the data registers 17, 19 in the floating point unit. Load rotate (LDX_ROT) then causes the data in the registers to be aligned before it is moved into the floating point unit to be used in conjunction with the floating point instructions received on bus 51 and from the instruction cache unit. Absent any further data cache misses, the system of the present invention continues loading data to the FPU by using the load ready, load register, and load rotate commands. In this manner, the FPU is able to perform out of order data loads and instruction executions. If another load float instruction is encountered while the miss is still present, the FPU will get the data from the other data bus (31 or 33). The address generators will have placed the address on the address bus 41 or 43 that corresponds to the data bus not subject to the cache miss. Thus, it can be seen how the present invention performs out of order load executions.

Figure 7:
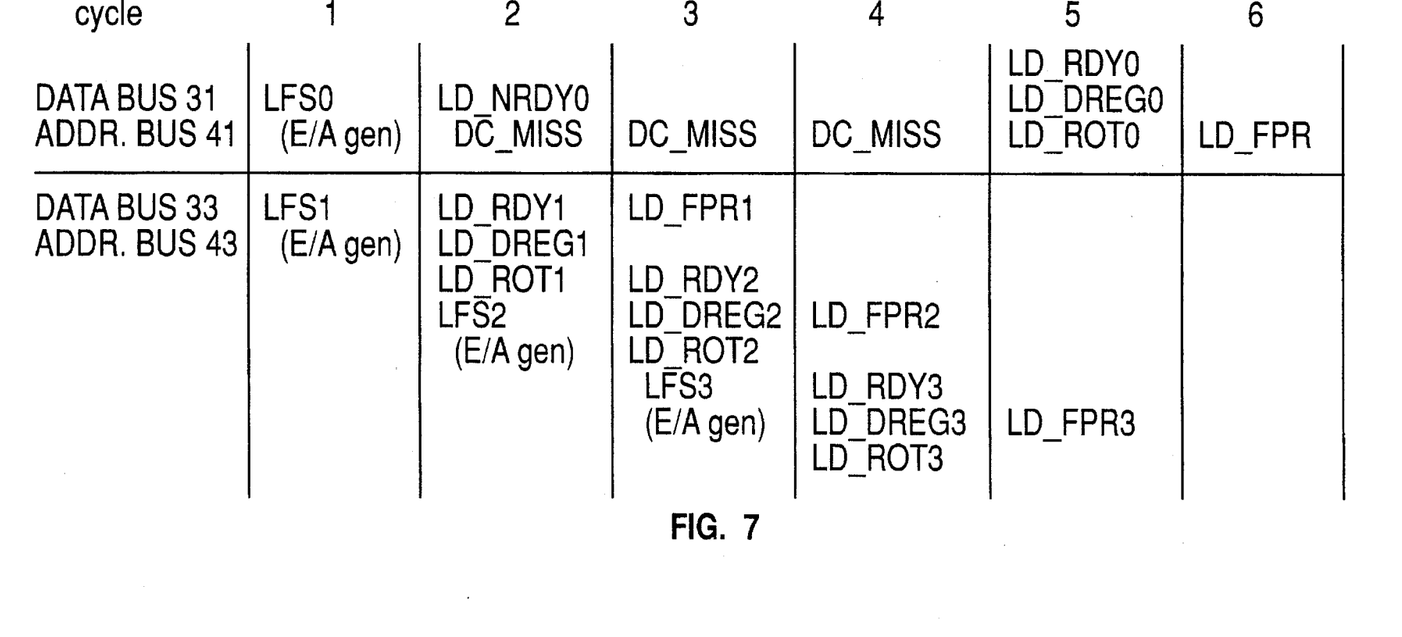
FIG. 7 shows the flow of synchronization signals with continue data cache misses over several machine cycles.

FIG. 7 shows the sequence of operations when data is placed on data buses 31, 33 associated when both of the data ports 32, 34 (0,1) are concurrently used, and a data miss occurs in the DCU for data to be placed on bus 31. At cycle 1, the FXU initiates two load float single operations (LFS) wherein data will be loaded from the two data buses 31, 33 into the FPU. The FXU also generates effective addresses for the two sets of data and applies the address via buses 41 and 43 to the data cache unit such that the data will be transferred to both of the data ports on the FPU, via buses 31 and 33. At cycle 2, a data not ready signal is sent from the FXU to the FPU indicating that an error, such as a data cache miss has occurred for the data to be placed on data bus 0 (bus 31 of FIG. 1). This data not ready signal will also tell the FPU that the next data will be received from data bus 33 at port 1, if the miss is still present during initiation of the next load float operation. Also at cycle 2, a data ready signal for the first data (1) on bus 33 is sent to the floating point unit, along with load data register and rotate signals. The data cache miss is till unresolved at cycle 3, thus, no change occurs for the data on bus 31. However, based on the data ready signal during cycle 2, the floating point registers 11 are loaded with data (1). Concurrently, at cycle 3, another data ready signal is sent corresponding to second data (2) on bus 33 along with load data register and rotate signals. Also during cycle 3, a third load float single operation is initiated for third data (3).

During the fourth cycle it can be seen that the data time, a load floating point registers 11 operation for the second data (2) occurs along with a load data register, load rotate and data ready signals, for the third data (3), which are supplied to the FPU by the FXU for data on bus 33. At cycle 5, the data cache miss has been resolved for bus 31 and data ready, load data register and rotate single are provided to the FPU indicating there is data on the bus. Additionally, the floating point registers 11 are loaded with the third data (LDX_FPR) from bus 33. Data from bus 31 is loaded into the floating point registers 11 in the FPU at cycle 6.

Figure 8:
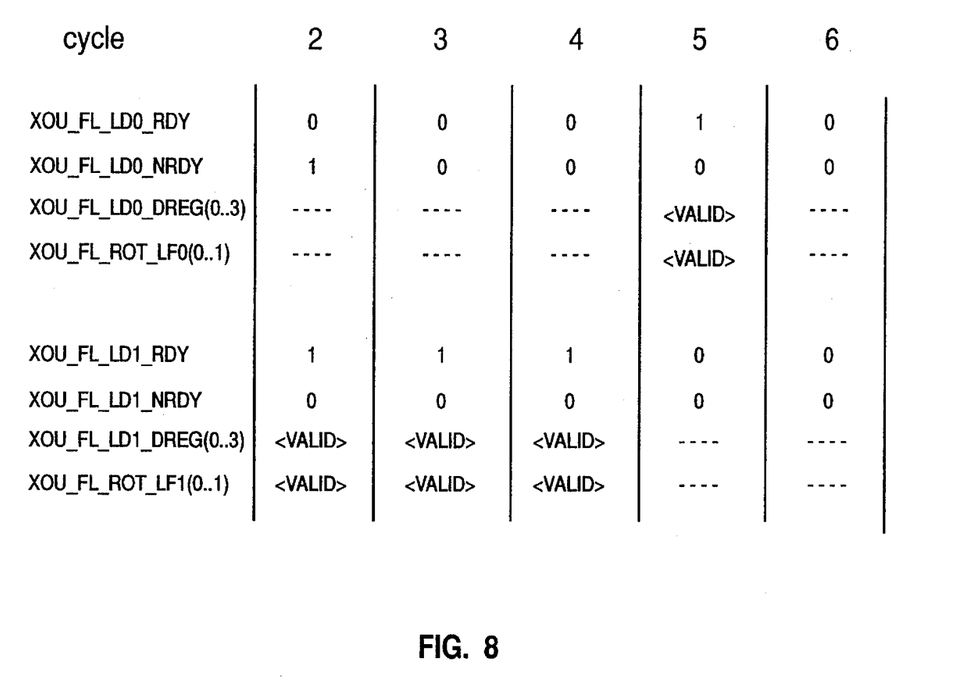
FIG. 8 is a chart illustrating the states of the various synchronization signals during six machine cycles.

Referring to FIG. 8, the Synchronization between the various signals shown in FIGS. 3 and 7 will be described. The machine cycles of FIG. 8 will correspond to the cycles shown in FIG. 7. At cycle 2, the load not ready signal for data bus 31 is at binary 1 indicating that the data is not ready to be loaded (due to the cache miss). This causes the load data register and rotate signals to be invalid (no data to indicate which data registers are to be loaded or how much to rotate the data), since the data is not even ready for placement onto the bus. For data bus 33, the load ready signal is active, thus causing the load data register and load rotate signals to be valid (contain data relating to these functions). At cycle 3 there is no synchronization signal for data to be loaded from bus 31 since the data cache miss is still present. With regard to bus 33, the data ready signal is active such that the load data register and rotate data signals are valid. There is no change in the system between cycles 3 and 4, since the data cache miss is still present on bus 31 and another data ready signal is active. At cycle 5, the data cache miss has been resolved and, correspondingly, the load data register and rotate signals are valid. Additionally, subsequent cycle 6 has returned to an idle state.

Although certain preferred embodiments have been shown and described, it should be understood that many changes and modifications can be made therein without departing from the scope of the appended claims.

We claim:

1. A method of transferring data to a floating point processor unit, comprising the steps of:

providing first data to a first data port on said floating point processor unit on a first data path;

detecting a first error condition on said first data path; and providing second data via a second data path, independent of said first data path, to a second data path on said floating point processor unit;

transmitting synchronizing control signals, directly from a fixed point processor to said floating point processor unit, to cause said floating point processor unit to receive said second data from said second data path when said first data is unavailable;

wherein said second data is provided to said floating point processor unit prior to said first data.

2. A method according to claim 1 further comprising the steps of:

storing first instructions corresponding to said first data;

executing second instructions corresponding to said second data; and executing said first instruction upon the resolution of said first error condition.

3. A method according to claim 2 wherein said step of providing first data comprises the step of:

generating a first address for said first data; and applying said first address to a first address bus corresponding to said first data path.

4. A method according to claim 3 wherein said step of providing second data comprises the steps of:

generating a second address for said second data; and applying said second address to a second address bus corresponding to said second data path.

5. A method according to claim 4 wherein said first and second addresses are generated by a fixed point processor.

6. A method according to claim 5 wherein said step of synchronizing comprises the steps of:

transmitting a data ready signal to said floating point unit indicating said first or second data is ready to be loaded;

detecting a second error condition on said second data path; and sending a data not ready signal to said floating point unit when either said first or second error condition is detected indicating data cannot be loaded from one of said first or second data paths, respectively, due to said first or second error condition.

7. A method according to claim 6 wherein said step of sending comprises the step of indicating that, during the existence of said first or second error condition, subsequent data will be provided to said floating point unit on the respective fist and second data path not subject to said first or second error.

8. A method according to claim 7 wherein said step of synchronizing further comprises the steps of:

sending a signal indicating that said first and second data is to be loaded into a data register in said floating point processor; and transmitting a signal indicating to rotate said first and second data into the correct alignment for processing by said floating point unit;

9. An apparatus for transferring data to a floating point processor unit, comprising:

means for providing first data to a first data port on said floating point processor unit on an first data path; means for detecting a first error condition on said first data path; and means for providing second data via a second data path, independent of said first data path, to a second data port on said floating point processor unit;

means for transmitting synchronizing control signals, directly from a fixed point processor to said floating point processor unit, to cause said floating point processor unit to receive said second data from said second data path when said first data is unavailable;

wherein said second data is provided to said floating point processor unit prior to said first data.

10. An apparatus according to claim 9 further comprising:

means for storing first instructions corresponding to said first data;

means for executing second instructions corresponding to said second data; and means for executing said first instructions upon the resolution of said first error condition.

11. An apparatus according to claim 10 wherein said means for providing first data comprises:

means for generating a first address for said first data; and means for applying said first address to a first address bus corresponding to said first data path.

12. An apparatus according to claim 11 wherein said means for providing second data comprises:

means for generating a second address for said second data; and means for applying said second address to a second address bus corresponding to said second data path.

13. A apparatus according to claim 12 wherein said first and second addresses are generated by a fixed point processor.

14. An apparatus according to claim 13 wherein said means for synchronizing comprises:

means for transmitting a data ready signal to said floating point unit indicating said first or second data is ready to be loaded;

means for detecting a second error condition on said second data path;

means for sending a data to ready signal to said floating point unit when either said first or second error condition is detected indicating data cannot be loaded from one of said first or second data paths, respectively, due to said first or second error condition.

15. An apparatus according to claim 14 wherein said means for sending comprises means for indicating that, during the existence of said first or second error condition, subsequent data will be provided to second data path not subject to said first or second error condition.

16. An apparatus according to claim 15 wherein said means for synchronizing further comprises:

means for sending a signal indicating that said first and second data is to be loaded into a data register in said floating point processor; and means for transmitting a signal to rotate said first and second data into the correct alignment for processing by said floating point unit.

17. An apparatus according to claim 16 wherein said first and second data path comprises first and second data ports contained in said floating point unit.

* * * * *

UNITED STATES PATENT AND TRADEMARK OFFICE
CERTIFICATE OF CORRECTION

PATENT NO. : 5,506,957
DATED : April 9, 1996
INVENTOR(S) : Richard E. Fry et al

It is certified that error appears in the above-indentified patent and that said Letters Patent is hereby corrected as shown below:

Col. 8, line 30, delete "path" and insert --port--; (2nd occ.)
      line 48, delete "step" and insert --steps--;
Col. 9, line 8, delete "fist and" and insert --first or--;
      line 15, delete "indicating";
Col. 10, line 21, delete "to", first occurrence, and insert --not--;
      line 29, after "to" insert --said floating point unit on the respective first or--.

Signed and Sealed this

Twelfth Day of May, 1998

Attest:

BRUCE LEHMAN

Attesting Officer      Commissioner of Patents and Trademarks